(12) United States Patent
Yamashita et al.

(10) Patent No.: US 10,196,469 B2
(45) Date of Patent: Feb. 5, 2019

(54) ACTIVE ENERGY RAY CURABLE RESIN COMPOSITION, AND CURED PRODUCT

(71) Applicant: SANYO CHEMICAL INDUSTRIES, LTD., Kyoto (JP)

(72) Inventors: Satoshi Yamashita, Kyoto (JP); Sachiko Shimazu, Kyoto (JP); Kazunori Yoshida, Kyoto (JP)

(73) Assignee: SANYO CHEMICAL INDUSTRIES, LTD., Kyoto (JP)

( * ) Notice: Subject to any disclaimer, the term of this patent is extended or adjusted under 35 U.S.C. 154(b) by 0 days.

(21) Appl. No.: 14/914,460

(22) PCT Filed: Aug. 26, 2014

(86) PCT No.: PCT/JP2014/072265
§ 371 (c)(1),
(2) Date: Feb. 25, 2016

(87) PCT Pub. No.: WO2015/037431
PCT Pub. Date: Mar. 19, 2015

(65) Prior Publication Data
US 2016/0222146 A1    Aug. 4, 2016

(30) Foreign Application Priority Data

Sep. 11, 2013  (JP) ................................ 2013-188514

(51) Int. Cl.
| | |
|---|---|
| *C08F 290/06* | (2006.01) |
| *C09D 4/06* | (2006.01) |
| *C08F 220/18* | (2006.01) |
| *C08F 226/06* | (2006.01) |
| *C08F 290/14* | (2006.01) |
| *C09D 175/16* | (2006.01) |
| *C08G 18/48* | (2006.01) |
| *C08G 18/67* | (2006.01) |
| *C08G 18/75* | (2006.01) |
| *C08G 18/76* | (2006.01) |

(52) U.S. Cl.
CPC .......... *C08F 220/18* (2013.01); *C08F 226/06* (2013.01); *C08F 290/067* (2013.01); *C08F 290/147* (2013.01); *C08G 18/4825* (2013.01); *C08G 18/672* (2013.01); *C08G 18/755* (2013.01); *C08G 18/7621* (2013.01); *C09D 4/06* (2013.01); *C09D 175/16* (2013.01); *C08F 2220/1891* (2013.01)

(58) Field of Classification Search
CPC .................. C08F 220/18; C08F 226/06; C08F 2220/1891; C08F 290/067; C08F 290/147; C08G 18/755; C08G 18/7621; C08G 16/672; C08G 18/4825; C09D 175/16; C09D 4/06
See application file for complete search history.

(56) References Cited

U.S. PATENT DOCUMENTS

| | | |
|---|---|---|
| 6,770,685 B1 | 8/2004 | Chang et al. |
| 2005/0261392 A1 | 11/2005 | Futami et al. |
| 2009/0263342 A1* | 10/2009 | Glenn, Jr. .............. A61K 8/345 424/70.11 |
| 2010/0007692 A1* | 1/2010 | Vanmaele ........... B29C 67/0055 347/21 |
| 2010/0233441 A1 | 9/2010 | Kubota et al. |
| 2013/0071632 A1* | 3/2013 | Fujishiro ................ B29D 11/00 428/195.1 |
| 2013/0234370 A1 | 9/2013 | Suzuki et al. |
| 2013/0237018 A1* | 9/2013 | Dilao ...................... H01L 24/83 438/118 |

FOREIGN PATENT DOCUMENTS

| | | |
|---|---|---|
| CN | 1703433 | 11/2005 |
| CN | 102695731 | 9/2012 |
| CN | 103189187 | 7/2013 |
| CN | 103261280 | 8/2013 |
| JP | 5-117348 | 5/1993 |
| JP | 2002-283365 | 10/2002 |
| JP | 2003-41148 | 2/2003 |
| JP | 2003-96146 | 4/2003 |
| JP | 2006-117826 | 5/2006 |
| JP | 2007-79128 | 3/2007 |
| JP | 2007-204567 | 8/2007 |
| JP | 2009-26387 | 2/2009 |

(Continued)

OTHER PUBLICATIONS

Suzuki et al., machine English translation of JP2012-111226 (pub Jun. 14, 2012).*

(Continued)

*Primary Examiner* — Jessica M Roswell
(74) *Attorney, Agent, or Firm* — Wenderoth, Lind & Ponack, L.L.P.

(57) ABSTRACT

The present invention provides an active energy ray-curable resin composition containing: (A) a monofunctional ethylenically unsaturated monomer free of urethane groups; (B) a polyfunctional ethylenically unsaturated monomer free of urethane groups; (C) a urethane group-containing ethylenically unsaturated monomer; (D) a photopolymerization initiator; (E) a polymerization inhibitor; and (F) a surfactant, wherein relative to the total weight of (A), (B), (C), (D), (E), and (F), the weight ratio of (A) is 45 to 90% by weight, the weight ratio of (B) is 3 to 25% by weight, the weight ratio of (C) is 3 to 35% by weight, the weight ratio of (D) is 0.1 to 10% by weight, the weight ratio of (E) is 0.01 to 5% by weight, and the weight ratio of (F) is 0.1 to 10% by weight, and the resin composition has a surface tension of 20 to 30 mN/m.

7 Claims, No Drawings

(56) References Cited

FOREIGN PATENT DOCUMENTS

| | | |
|---|---|---|
| JP | 2010-31152 | 2/2010 |
| JP | 2012-111226 | 6/2012 |
| JP | 2013-64126 | 4/2013 |

OTHER PUBLICATIONS

International Search Report dated Dec. 9, 2014 in corresponding International Application No. PCT/JP2014/072265.

* cited by examiner

ACTIVE ENERGY RAY CURABLE RESIN COMPOSITION, AND CURED PRODUCT

TECHNICAL FIELD

The present invention relates to an active energy ray-curable resin composition and a cured product thereof.

BACKGROUND ART

For protection of the surface of transparent plastic films and optical lenses, recently, there has been a need for coating materials having excellent curability and capable of forming cured films having transparency and excellent scratch resistance. Such materials that have been known include, for example, those obtained by adding a silicone compound or a fluorine compound to a resin composition curable by ultraviolet light or the like (for example, see Patent Literatures 1 and 2).

CITATION LIST

Patent Literature

Patent Literature 1: JP-A 2003-041148
Patent Literature 2: JP-A 2002-283365

SUMMARY OF INVENTION

Technical Problem

However, the silicone compound and the fluorine compound unfortunately have poor compatibility with a polyol component constituting a resin composition curable by ultraviolet light or the like. Consequently, the resulting cured product unfortunately has poor scratch resistance.

An object of the present invention is to provide an active energy ray-curable resin composition capable of forming a cured product having excellent scratch resistance.

Solution to Problem

The present inventors conducted extensive studies to solve the problem and accomplished the present invention. Specifically, the present invention provides an active energy ray-curable resin composition containing: (A) a monofunctional ethylenically unsaturated monomer free of urethane groups; (B) a polyfunctional ethylenically unsaturated monomer free of urethane groups; (C) a urethane group-containing ethylenically unsaturated monomer; (D) a photopolymerization initiator; (E) a polymerization inhibitor; and (F) a surfactant, wherein relative to the total weight of (A), (B), (C), (D), (E), and (F), the weight ratio of (A) is 45 to 90% by weight, the weight ratio of (B) is 3 to 25% by weight, the weight ratio of (C) is 3 to 35% by weight, the weight ratio of (D) is 0.1 to 10% by weight, the weight ratio of (E) is 0.01 to 5% by weight, and the weight ratio of (F) is 0.1 to 10% by weight; and the resin composition has a surface tension of 20 to 30 mN/m. The present invention also relates to a cured product obtained by curing the active energy ray-curable resin composition by active energy ray irradiation.

Advantageous Effects of Invention

The active energy ray-curable resin composition of the present invention achieves the following effects.

(1) A cured product obtained by curing the composition has excellent scratch resistance.
(2) The cured product has excellent mechanical properties.

DESCRIPTION OF EMBODIMENTS

The active energy ray-curable resin composition of the present invention characteristically has a surface tension of 20 to 30 mN/m. The surface tension as mentioned herein is measured by a method described later.

The surface tension of the resin composition can be adjusted within the above range by selecting the types of the below-described components (A) to (F) constituting the resin composition and the amounts thereof.

If the surface tension of the resin composition is 30 mN/m or less, a cured product obtained by curing the resin composition by active energy ray irradiation will have small surface free energy and the surface becomes slippery, resulting in an improved scratch resistance (as an alternative assessment to measure the surface free energy, the level of surface free energy can be determined by measuring the contact angle of a liquid such as water with respect to the cured product).

Thus, it is preferred that the surface tension of the resin composition be smaller.

A realistic lower limit of the surface tension of the resin composition is 20 mN/m. Thus, the range of the surface tension is 20 to 30 mN/m, preferably 21 to 28 mN/m.

The surface tension of the resin composition can be adjusted within the above range by the following method: in the case of reducing the surface tension, for example, the polarity of the components to be used, such as the monofunctional ethylenically unsaturated monomer free of urethane groups (A), the polyfunctional ethylenically unsaturated monomer free of urethane groups (B), and the urethane group-containing ethylenically unsaturated monomer (C), is reduced. Specifically, the surface tension can be reduced by the use of materials having lower SP values (described later) as these monomers. Alternatively, the surface tension can be reduced by, for example, increasing the amount of the surfactant (F), or by using a material, as the surfactant (F), having high surface tension adjusting effect (the degree to which the surface tension changes more than commensurate with volume fraction of added surfactant). These methods can be combined.

The active energy ray-curable resin composition of the present invention essentially contains the monofunctional ethylenically unsaturated monomer free of urethane groups (A), the polyfunctional ethylenically unsaturated monomer free of urethane groups (B), the urethane group-containing ethylenically unsaturated monomer (C), the photopolymerization initiator (D), the polymerization inhibitor (E), and the surfactant (F).

(Monofunctional Ethylenically Unsaturated Monomer Free of Urethane Groups (A))

The monofunctional ethylenically unsaturated monomer free of urethane groups (A) is not particularly limited as long as it is a compound having one ethylenically unsaturated group (such as a (meth)acryloyl group or a vinyl group). In view of reducing the surface tension of the resin composition, the component (A) is preferably a monomer (A1) that is a monofunctional ethylenically unsaturated monomer free of urethane groups and having a low polarity, i.e., having an SP (solubility parameter; measured by a unit of $(cal/cm^3)^{1/2}$) value of 12.5 or lower.

The SP value as mentioned herein is calculated by the method proposed by Fedors et al in the following document.

"POLYMER ENGINEERING AND SCIENCE, February, 1974, Vol. 14, No. 2, Robert F. Fedors (pp. 147 to 154)"

Examples of (A1) include linear or branched alkyl (meth)acrylates (compounds having 4 to 30 carbon atoms, such as methyl (meth)acrylate, ethyl (meth)acrylate, isobutyl (meth)acrylate, lauryl (meth)acrylate, stearyl (meth)acrylate, isostearyl (meth)acrylate, and t-butyl (meth)acrylate); alicyclic skeleton-containing (meth)acrylates (compounds having 6 to 20 carbon atoms, such as cyclohexyl (meth)acrylate, t-butylcyclohexyl (meth)acrylate, isobornyl (meth)acrylate, 1-adamantyl (meth)acrylate, and dicyclopentanyl (meth)acrylate); and heterocyclic skeleton-containing (meth)acrylates (compounds having 5 to 20 carbon atoms, such as tetrahydrofurfuryl (meth)acrylate, 4-(meth)acryloyloxymethyl-2-methyl-2-ethyl-1,3-dioxolan, and 4-(meth)acryloyloxymethyl-2-cyclohexyl-1,3-dioxolan).

In view of improving the curing accuracy to withstand the usual curing temperature (50° C. to 90° C.) of the active energy ray-curable resin composition and in view of heat resistance of a cured product obtained by curing the resin composition by active energy rays during use of the cured product, more preferred among these examples of (A1) are monomers whose homopolymers have a high glass transition temperature (hereinafter abbreviated as Tg) (50° C. or higher), i.e., methyl (meth)acrylate, ethyl (meth)acrylate, and stearyl (meth)acrylate among alkyl (meth)acrylates; and isobornyl (meth)acrylate, dicyclopentanyl (meth)acrylate, and adamantyl (meth)acrylate among alicyclic skeleton-containing (meth)acrylates. Particularly preferred among these in view of photoreactivity are highly reactive acrylates, i.e., isobornyl acrylate, dicyclopentanyl acrylate, and adamantyl acrylate among alicyclic skeleton-containing acrylates.

Examples of the monofunctional ethylenically unsaturated monomer free of urethane groups (A) other than (A1) include hydroxyl group-containing (meth)acrylates having 5 to 15 carbon atoms (such as hydroxyethyl (meth)acrylate, hydroxypropyl (meth)acrylate, and 4-hydroxybutyl (meth)acrylate); hydroxyl group-containing (meth)acrylates having a number average molecular weight (hereinafter abbreviated as Mn) of 200 to 2,000 (such as polyethylene glycol (hereinafter abbreviated as PEG) mono(meth)acrylate, methoxypolyethylene glycol mono(meth)acrylate, polypropylene glycol (hereinafter abbreviated as PPG) mono(meth)acrylate, methoxypolypropylene glycol mono (meth)acrylate, and mono (meth)acrylates of PEG-PPG block polymers); (meth)acrylamide derivatives having 3 to 15 carbon atoms (such as (meth)acrylamide, N-methyl (meth)acrylamide, N-ethyl (meth)acrylamide, N-propyl (meth)acrylamide, N-butyl (meth)acrylamide, N,N'-dimethyl (meth)acrylamide, N,N'-diethyl (meth)acrylamide, N-hydroxyethyl (meth)acrylamide, N-hydroxypropyl (meth)acrylamide, and N-hydroxybutyl (meth)acrylamide); and (meth)acryloylmorpholine.

Herein, the Mn can be measured by gel permeation chromatography (GPC) under the following conditions, for example.

[1] Device: gel permeation chromatograph
  Model "HLC-8120 GPC" produced by Tosoh Corporation
[2] Columns: two "TSKgel GMHXL (product name)" columns and one "TSKgel Multipore HXL-M (product name)" column produced by Tosoh Corporation
[3] Eluent: tetrahydrofuran (THF)
[4] Standard material: standard polystyrene
  (TSK Standard Polystyrene) produced by Tosoh Corporation
[5] Injection conditions: sample concentration of 0.25% by weight, column temperature of 40° C.

Each monofunctional ethylenically unsaturated monomer free of urethane groups (A) may be used alone or in combination of two or more thereof if necessary.

(Polyfunctional Ethylenically Unsaturated Monomer Free of Urethane Groups (B))

The polyfunctional ethylenically unsaturated monomer free of urethane groups (B) is not particularly limited as long as it is a compound free of urethane groups and having two or more ethylenically unsaturated groups.

The presence of (B) in the active energy ray-curable resin composition can improve mechanical strength and elastic modulus of the cured product.

The component (B) is not particularly limited as long as it has two or more (preferably two or three) ethylenically unsaturated groups in the molecule. In view of reducing the surface tension, the component (B) is preferably a monomer (B1) that is a polyfunctional ethylenically unsaturated monomer free of urethane groups and having a low polarity, i.e., an SP (solubility parameter) value of 12.5 or lower.

Examples of (B1) include linear or branched alkylene glycol di(meth)acrylates (compounds having 10 to 25 carbon atoms, such as 1,6-hexanediol di(meth)acrylate, neopentyl glycol di(meth)acrylate, 1,9-nonanediol di(meth)acrylate, 3-methyl-1,5-pentanediol di(meth)acrylate, and 2-n-butyl-2-ethyl-1,3-propanediol di(meth)acrylate), alicyclic skeleton-containing di(meth)acrylates (compounds having 10 to 30 carbon atoms, such as dimethyloltricyclodecane di(meth)acrylate and cyclohexane dimethanol di(meth)acrylate)), and poly(meth)acrylates of trihydric or higher hydric polyols (compounds having 10 to 25 carbon atoms, preferably tri(meth)acrylates of triols such as trimethylolpropane tri(meth)acrylate).

In view of improving the curing accuracy to withstand the usual curing temperature (50° C. to 90° C.) of the active energy ray-curable resin composition and in view of heat resistance of a cured product obtained by curing the resin composition by active energy rays during use of the cured product, more preferred among these examples of (B1) are monomers whose homopolymers have a high glass transition temperature (50° C. or higher), i.e., neopentyl glycol di(meth)acrylate and 3-methyl-1,5-pentanediol di(meth)acrylate among branched alkylene glycol di(meth)acrylates, and dimethyloltricyclodecane di(meth)acrylate, cyclohexane dimethanol di(meth)acrylate, and dicyclopentane dimethylol di(meth)acrylate among alicyclic skeleton-containing di(meth)acrylates. Particularly preferred among these in view of photoreactivity are highly reactive acrylates, i.e., neopentyl glycol diacrylate, 3-methyl-1,5-pentanediol diacrylate, dimethylol tricyclodecane diacrylate, and dicyclopentane dimethylol diacrylate.

Each polyfunctional ethylenically unsaturated monomer free of urethane groups (B) may be used alone or in combination of two or more thereof if necessary.

(Urethane Group-Containing Ethylenically Unsaturated Monomer (C))

The urethane group-containing ethylenically unsaturated monomer (C) is a monomer having one or more ethylenically unsaturated groups and a urethane group. The presence of (C) in the active energy ray-curable resin composition results in a cured product having toughness and allows for adjustment of toughness and elongation of the cured product.

Examples of (C) include those formed from the following components: (a) a compound having a hydroxyl group and a (meth)acryloyl group; and (b) a polyisocyanate. The component (C) is preferably a monomer (C1) having a low polarity, i.e., having an SP value of 12.5 or lower.

Examples of (a) include compounds having 5 or more carbon atoms and an Mn of 5,000 or less, such as the following compounds and mixtures of two or more thereof.

(a1): An alkylene oxide (hereinafter abbreviated as AO) adduct of (meth)acrylic acid (alkylene in AO preferably has 2 to 4 carbon atoms).

Examples include 2-hydroxyethyl (meth)acrylate, 2-hydroxypropyl (meth)acrylate, 2-hydroxybutyl (meth)acrylate, and additional AO adducts thereof (chemical formula weight or Mn of 160 to 5,000).

(a2): An ε-caprolactone adduct of (a1) (chemical formula weight or Mn of 230 to 5,000).

Examples include 2-hydroxyethyl (meth)acrylate-ε-caprolactone 2- to 4-mol adducts.

(a3): A reaction product of (meth)acrylic acid and diol (Mn of 300 to 5,000).

Examples include mono (meth)acrylates of diols (Mn of 300 to 5,000, such as polycarbonate diol, PEG, and polyester diol).

(a4): A reaction product (having 8 to 30 carbon atoms) of (meth)acrylic acid and an epoxide.

Examples include 3-phenoxy-2-hydroxypropyl (meth)acrylate and 3-biphenoxy-2-hydroxypropyl (meth)acrylate.

(a5): A reaction product of (meth)acrylic acid and a tri- or higher functional polyol (chemical formula weight or Mn of 92 to 5,000).

Examples include glycerol mono- or di(meth)acrylate, trimethylolpropane mono- or di (meth)acrylate, pentaerythritol mono-, di- or tri(meth)acrylate, ditrimethylolpropane mono-, di-, or tri (meth)acrylate, dipentaerythritol mono-, di-, tri-, tetra-, or penta(meth)acrylate, and AO adducts thereof (the number of moles added is 1 to 100).

In view of toughness, (a1) and (a2) are preferred among these examples of (a).

Examples of the poly(di, tri, or higher) isocyanate (b) include aromatic polyisocyanates (compounds having 6 to 20 carbon atoms (excluding carbon atoms in the isocyanate group; the same shall apply hereinafter), such as 2,4- or 2,6-tolylene diisocyanate (TDI) and 4,4'- or 2,4'-diphenylmethane diisocyanate (MDI)), aliphatic polyisocyanates (compounds having 2 to 18 carbon atoms, such as hexamethylene diisocyanate (HDI)), alicyclic polyisocyanates (compounds having 4 to 45 carbon atoms, such as isophorone diisocyanate (hereinafter abbreviated as IPDI), 2,4- or 2,6-methylcyclohexane diisocyanate (hydrogenated TDI) and dicyclohexylmethane-4,4'-diisocyanate (hydrogenated MDI)), aromatic-aliphatic polyisocyanates (compounds having 8 to 15 carbon atoms, such as m- or p-xylylene diisocyanate (XDI) and α,α,α',α'-tetramethylxylylene diisocyanate (TMXDI)), nurate compounds thereof, and mixtures thereof.

In producing the urethane group-containing ethylenically unsaturated monomer (C), a component having a hydroxyl group and free of unsaturated groups (f) other than (a) may further be added as a reactive component in view of toughness and elongation of the cured product.

Examples of (f) include polyhydric alcohols having one or more carbon atoms and an Mn of 3,000 or less (such as ethylene glycol, propylene glycol, glycerol, and polyalkylene glycol) and monohydric alcohols (such as methanol and ethanol). Preferred among these are monohydric alcohols in view of impact resistance of the cured product.

As for the Mn of (C) the lower limit is preferably 500 or more, more preferably 700 or more in view of impact resistance of the cured product, and the upper limit is preferably 50,000 or less, more preferably 20,000 or less in view of handleability of the active energy ray-curable resin composition and curing accuracy of the cured product.

The number of functional groups of the ethylenically unsaturated group in (C) is preferably 1 to 20, more preferably 1 to 3 in view of hardness and impact resistance of the cured product.

Preferred examples of (C) include urethane (meth)acrylates produced by reacting the following materials: one or two or more selected from AO adducts of (meth)acrylic acid (alkylene in AO has 2 or 3 carbon atoms) (preferably such as 2-hydroxyethyl (meth)acrylate and 2-hydroxypropyl (meth)acrylate) and ε-caprolactone 2 to 4-mol adducts thereof; one or two or more selected from aromatic polyisocyanate (preferably such as TDI), alicyclic polyisocyanate (preferably such as IPDI), and nurate compounds thereof; and further, if necessary, one or two or more of the components having a hydroxyl group and free of unsaturated groups (f).

Examples of commercial products of (C) include "Photomer 6010" (average functional group number of 2, Mn of 1,300) produced by Cognis.

Each urethane group-containing ethylenically unsaturated monomer (C) may be used alone or in combination of two or more thereof if necessary.

(Photopolymerization Initiator (D))

Examples of the photopolymerization initiator (D) include benzoin compounds (compounds having 14 to 18 carbon atoms, such as benzoin, benzoin methyl ether, benzoin ethyl ether, benzoin propyl ether, and benzoin isobutyl ether);

acetophenone compounds (compounds having 8 to 18 carbon atoms, such as acetophenone, 2,2-diethoxy-2-phenylacetophenone, 1,1-dichloroacetophenone, 2-hydroxy-2-methyl-phenylpropan-1-one, diethoxyacetophenone, 1-hydroxycyclohexyl phenyl ketone, and 2-methyl-1-[4-(methylthio)phenyl]-2-morpholinopropan-1-one);

anthraquinone compounds (compounds having 14 to 19 carbon atoms, such as 2-ethylanthraquinone, 2-t-butylanthraquinone, 2-chloroanthraquinone, and 2-amylanthraquinone);

thioxanthone compounds (compounds having 13 to 17 carbon atoms, such as 2,4-diethylthioxanthone, 2-isopropylthioxanthone, and 2-chlorothioxanthone);

ketal compounds (compounds having 16 to 17 carbon atoms, such as acetophenone dimethyl ketal and benzyl dimethyl ketal];

benzophenone compounds (compounds having 13 to 21 carbon atoms, such as benzophenone, 4-benzoyl-4'-methyl diphenyl sulfide, and 4,4'-bis-methylamino benzophenone);

phosphine oxides (compounds having 22 to 28 carbon atoms, such as 2,4,6-trimethylbenzoyl diphenylphosphine oxide, bis-(2,6-dimethoxybenzoyl)-2,4,4-trimethylpentylphosphine oxide, and bis(2,4,6-trimethylbenzoyl)-phenylphosphine oxide); and mixtures thereof.

Each (D) may be used alone or in combination of two or more thereof.

In view of light resistance to protect the cured product from yellowing, preferred among these examples of (D) are acetophenone compounds and phosphine oxides; more preferred are 1-hydroxycyclohexyl phenyl ketone, 2-methyl-1-[4-(methylthio)phenyl]-2-morpholinopropan-1-one, 2,4,6-trimethylbenzoyl diphenylphosphine oxide, and bis-(2,6-dimethoxybenzoyl)-2,4,4-trimethylpentyl phosphine oxide;

and particularly preferred are 1-hydroxycyclohexyl phenyl ketone and 2,4,6-trimethylbenzoyl diphenylphosphine oxide.

(Polymerization Inhibitor (E))

Examples of the polymerization inhibitor (E) include phenol compounds (such as hydroquinone, hydroquinone monomethylether, 2,6-di-t-butyl-p-cresol, 2,2-methylene-bis-(4-methyl-6-t-butylphenol), and 1,1,3-tris-(2-methyl-4-hydroxy-5-t-butylphenyl)butane), sulfur compounds (such as dilauryl thiodipropionate), phosphorus compounds (such as triphenyl phosphite), and amine compounds (such as phenothiazine).

Each (E) may be used alone or in combination of two or more thereof.

(Surfactant (F))

Examples of the surfactant (F) include PEG-based non-ionic surfactants (such as an ethylene oxide (hereinafter abbreviated as EO) 1- to 40-mol adduct of nonylphenol and an EO 1- to 40-mol adduct of stearic acid), polyhydric alcohol-based nonionic surfactants (such as sorbitan palmitic acid monoester, sorbitan stearic acid monoester, and sorbitan stearic acid triester), fluorine-containing surfactants (such as a perfluoroalkyl EO 1- to 50-mol adduct, perfluoroalkyl carboxylate, and perfluoroalkyl betaine), and polysiloxanes partially modified with a substituent (herein, polysiloxane is also referred to as "silicone oil").

As for the polysiloxanes partially modified with a substituent, the substituent is preferably a polyether group, a (meth)acryloyl group, a fluorine-containing group, epoxy group, or an amino group, for example. A polyether group is preferred in view of compatibility.

Examples of the polysiloxanes partially modified with a substituent include a polysiloxane modified with a polyether group, a polysiloxane modified with a (meth)acryloyl group, a polysiloxane modified with a fluorine-containing group, a polysiloxane modified with an epoxy group, a polysiloxane modified with an amino group, and a polysiloxane modified with an amino group and a polyether group.

Each (F) may be used alone or in combination of two or more thereof.

The Mn of (F) is preferably 264 to 5,000 in view of compatibility.

Examples of commercial products of (F) include fluorine-containing surfactants (such as "Magafac F-470" and "Magafac F-477" produced by DIC), polysiloxanes modified with a polyether group (such as "KF-355A" produced by Shin-Etsu Chemical Co., Ltd., and "BYK (registered trademark) 307", "BYK 331", and "BYK 333" produced by BYK-Chemie Japan KK), polysiloxanes modified with an epoxy group (such as "X-22-163A" produced by Shin-Etsu Chemical Co., Ltd.), polysiloxane modified with an amino group (such as "X-22-161B" produced by Shin-Etsu Chemical Co., Ltd.), and polysiloxanes modified with an amino group and a polyether group (such as "X-22-3939A" produced by Shin-Etsu Chemical Co., Ltd.).

Preferred among these examples of (F) are polysiloxanes partially modified with a substituent, because of their high surface tension adjusting effect and good solubility in each of the components (A) to (E) constituting the active energy ray-curable resin composition.

The weight ratio of (A) in the active energy ray-curable resin composition of the present invention is 45 to 90% by weight, preferably 50 to 85% by weight based on the total weight of (A) to (F), in view of increasing the Tg of the cured product and in view of brittleness resistance thereof.

The weight ratio of (B) in the active energy ray-curable resin composition of the present invention is 3 to 25% by weight, preferably 4 to 20% by weight based on the total weight of (A) to (F), in view of mechanical strength and brittleness resistance of the cured product.

The weight ratio of (C) in the active energy ray-curable resin composition of the present invention is 3 to 35% by weight, preferably 5 to 30% by weight based on the total weight of (A) to (F), in view of toughness and hardness of the cured product.

The weight ratio of (D) in the active energy ray-curable resin composition of the present invention is 0.1 to 10% by weight, preferably 0.3 to 8% by weight based on the total weight of (A) to (F), in view of curing rate and mechanical properties of the cured product.

The weight ratio of (E) in the active energy ray-curable resin composition of the present invention is 0.01 to 5% by weight, preferably 0.05 to 3% by weight based on the total weight of (A) to (F), in view of storage stability and polymerization rate of the active energy ray-curable resin composition.

The weight ratio of (F) in the active energy ray-curable resin composition of the present invention is 0.1 to 10% by weight, preferably 0.1 to 8% by weight based on the total weight of (A) to (F), in view of adjusting the surface tension of the active energy ray-curable resin composition and in view of contact angle of the cured product formed from the active energy ray-curable resin composition relative to water.

In the case where each of the components (A) to (F) includes several kinds of compounds, the total weight of these several kinds of compounds is used for the weight ratio of each of the components (A) to (F).

(Additional Additive (G))

The active energy ray-curable resin composition of the present invention may contain an additional additive (G), if necessary, to a degree that does not impair the effects of the present invention.

Examples of (G) include colorants, antioxidants, chain transfer agents, and fillers. Various types thereof can be selected according to the purpose. Each additive may be used alone or in combination of two or more thereof.

Examples of colorants include pigments and dyes. Pigments include organic pigments and inorganic pigments. The following pigments can be exemplified.

(1) Azo Pigments

Insoluble monoazo pigments (such as toluidine red, permanent carmine FB, and fast yellow G), insoluble disazo pigments (such as disazo yellow AAA and disazo orange PMP), azo lakes (soluble azo pigments) (such as lake red C and brilliant carmine 6B), condensed azo pigments, and chelate azo pigments.

(2) Polycyclic Pigments

Phthalocyanine blue, indanthrone blue, quinacridone red, and dioxazine violet.

(3) Dye Lakes

Basic dyes (such as Victoria Pure Blue BO Lake) and acid dyes (such as alkali blue toner).

(4) Others

Azine pigments (such as aniline black), daylight fluorescent pigments, nitroso pigments, nitro pigments, and natural pigments.

Examples of inorganic pigments include metal oxides (such as iron oxide, chromium oxide, and titanium oxide) and carbon black.

The amount of the colorant to be used is preferably 10% by weight or less based on the total weight of (A) to (F), and it is more preferably 0.1 to 8% by weight in view of coloring effect and curing properties.

Examples of antioxidants include phenol compounds (monocyclic phenols (such as 2,6-di-t-butyl-p-cresol), bisphenols (such as 2,2'-methylenebis(4-methyl-6-t-butylphenol)), polycyclic phenols (such as 1,3,5-trimethyl-2,4,6-tris(3,5-di-t-butyl-4-hydroxybenzyl)benzene)), sulfur compounds (such as dilauryl 3,3'-thiodipropionate), phosphorus compounds (such as triphenyl phosphite), and amine compounds (such as octylated diphenylamine).

The amount of the antioxidant to be used is preferably 3% by weight or less based on the total weight of (A) to (F), and it is more preferably 0.1 to 2% by weight in view of antioxidant effect and curing properties.

Examples of chain transfer agents include hydrocarbons (compounds having 4 to 24 carbon atoms, such as aromatic hydrocarbons (such as toluene and xylene) and unsaturated aliphatic hydrocarbons (such as 1-butene and 1-nonene));

halogenated hydrocarbons (compounds having 1 to 24 carbon atoms, such as dichloromethane and carbon tetrachloride);

alcohols (compounds having 1 to 24 carbon atoms, such as methanol and 1-butanol);

thiols (compounds having 1 to 24 carbon atoms, such as ethylthiol and 1-octylthiol);

ketones (compounds having 3 to 24 carbon atoms, such as acetone and methyl ethyl ketone);

aldehydes (compounds having 2 to 18 carbon atoms, such as 2-methyl-2-propyl aldehyde and 1-pentyl aldehyde);

phenols (compounds having 6 to 36 carbon atoms, such as phenol and m-, p-, or o-cresol);

quinones (compounds having 6 to 24 carbon atoms, such as hydroquinone);

amines (compounds having 3 to 24 carbon atoms, such as diethylmethylamine and diphenylamine); and disulfides (compounds having 2 to 24 carbon atoms, such as diethyl disulfide and di-1-octyl disulfide).

The amount of the chain transfer agent to be used is preferably 10% by weight or less based on the total weight of (A) to (F), and it is more preferably 0.05 to 5% by weight in view of polymerizability of the monomer and compatibility between the monomer and the chain transfer agent.

Examples of fillers include metal powders (such as aluminum powder and copper powder), metal oxides (such as alumina, silica, talc, mica, and clay), metal hydroxides (such as aluminum hydroxide), metal salts (such as calcium carbonate and calcium silicate), metal-organic frameworks (MOF), fibers (inorganic fibers (such as carbon fibers, glass fibers, and asbestos), organic fibers (such as cotton, nylon, acrylic, and rayon fibers)), microballoons (such as glass, shirasu, and phenolic resin), carbons (such as carbon black, graphite, and coal powder), metal sulfides (such as molybdenum disulfide), and organic powders (such as wood powder).

The amount of the filler to be used is preferably 30% by weight or less based on the total weight of (A) to (F), and it is more preferably 3 to 20% by weight in view of filling effect and physical properties of the cured product.

The total amount of the additional additive (G) is preferably 30% by weight or less based on the total weight of (A) to (F), and it is more preferably 0.05 to 20% by weight in view of adding effect and curing properties.

The active energy ray-curable resin composition of the present invention can be produced by kneading the components (A) to (F), and the additional additive (G) which is added if necessary, using a known device, such as a planetary centrifugal mixer, ball mill, or triple roll mill. The kneading temperature is preferably 10° C. to 40° C., more preferably 20° C. to 30° C.

The active energy ray-curable resin composition of the present invention is cured by active energy ray irradiation into a cured product. The present invention also encompasses a cured product obtained by curing the active energy ray-curable resin composition of the present invention by active energy ray irradiation.

The method for producing the cured product of the present invention is not particularly limited. For example, the active energy ray-curable resin composition is applied to at least a portion of the surface of a substrate to form a coating, and the coating is cured by active energy ray irradiation (described later). In this manner, a coated material including a cured product (cured film) formed on at least a part of the substrate can be produced. During application, the temperature of the active energy ray-curable resin composition is preferably set to, for example, 20° C. to 50° C. The thickness of the applied coating is not particularly limited. Yet, for example, the coating thickness after curing is preferably 5 to 500 μm. The substrate is not particularly limited, and examples thereof include films and sheets made of various plastics (for example, polyolefins (such as polyethylene and polypropylene), polyurethane, polyethylene terephthalate, polyvinyl chloride, polyamide, triacetyl cellulose, polycarbonate, and methyl methacrylate (co)polymers), and glass.

The method for producing a molded product from the cured product is also not particularly limited. For example, the temperature of the resin composition of the present invention is adjusted to 20° C. to 50° C. in advance, and the resin composition is applied to or introduced into the inside of a mold such as a metal mold having a desired shape of a molded product (the mold temperature is usually 20° C. to 50° C., preferably 25° C. to 40° C.) using a dispenser or the like, to a thickness after curing of, for example, 5 to 500 μm. Thus, a coating film is formed, and a transparent substrate (including a transparent film) is laminated on the coating film under pressure without trapping air. The coating film is irradiated through the transparent substrate with active energy rays (described later) for curing, and then, the resulting product is released from the mold. Thus, a molded product can be obtained.

Examples of the transparent substrate (including a transparent film) include those formed from resins such as methyl methacrylate (co)polymers, polyethylene terephthalate, polycarbonate, polytriacetyl cellulose, and polycycloolefin; and transparent glass plates.

The method for applying the active energy ray-curable resin composition to a substrate or the like is not particularly limited. Examples of applicable methods include known coating methods such as spin coating, roll coating, and spray coating; and printing methods such as nanoimprint process, lithography, carton printing, metal printing, offset printing, screen printing, and gravure printing.

Examples of active energy rays mentioned herein include active light rays and electron beams.

As used herein, the term "active light rays" refers to light rays having a wavelength of 250 nm to 830 nm.

In the case of curing the resin composition of the present invention by active energy rays, various active energy ray irradiation devices (such as an ultraviolet light irradiation device (model number "VPS/I600" produced by Fusion UV Systems, Inc.)) can be used. Examples of lamps that can be used include high pressure mercury lamps and metal halide lamps. The dose of active energy rays is preferably 10 to 10,000 mJ/cm$^2$, more preferably 100 to 5,000 mJ/cm$^2$, in view of curability of the composition and flexibility of the cured product.

The Tg of the cured product of the active energy ray-curable resin composition of the present invention is preferably 50° C. to 150° C., more preferably 55° C. to 140° C., particularly preferably 60° C. to 130° C., in view of heat resistance of the cured product and in view of reducing warpage of the cured product. Herein, the Tg of the cured product is a value measured by a method described below. The Tg can be adjusted within the above range by selecting the type and amount of each of the components (A) to (F) constituting the active energy ray-curable resin composition.

One of the methods for adjusting the Tg of the cured product within the above range is as follows: since the Tg can be estimated by the formula "sum of (Tg of each homopolymer×weight fraction of constituent monomers)/total weight fraction" for the components (A), (B), and (C) constituting the active energy ray-curable resin composition, the Tg of the active energy ray-curable resin composition can be increased by, for example, using a monomer whose homopolymer has a high Tg as one of the components (A), (B), and (C) constituting the active energy ray-curable resin composition or by increasing the content of a monomer whose homopolymer has a high Tg.

The active energy ray-curable resin composition and the cured product of the present invention can be used for any application, and are suitably used as various industrial materials such as coating materials used for coating of plastic films, optical lens, and the like.

EXAMPLES

The present invention is described in more detail below with reference to examples, but the present invention is not limited to these examples. Parts and % indicate parts by weight and % by weight, respectively, unless otherwise specified.

Production Example 1

A reaction vessel equipped with a stirrer was charged with 28.59 parts of TDI, 0.021 parts of 2,6-di-t-butyl-p-cresol, 0.072 parts of dibutyltin dilaurate, and 0.007 parts of phenothiazine, followed by cooling with ice to a liquid temperature of 10° C. or lower with stirring. To the above mixture was added 82.06 parts of oxypropylene glycol having an Mn of 1,000, and the reaction was carried out with stirring for two hours while controlling the liquid temperature to 35° C. or lower. Subsequently, 9.70 parts of 2-hydroxypropyl acrylate was added dropwise thereto, and 24.74 parts of 2-hydroxyethyl acrylate was further added dropwise thereto. Stirring was continued for three hours at a liquid temperature of 70° C. to 75° C., and the reaction was terminated when the concentration of the residual isocyanate group reached 0.1% or lower. Thus, a urethane group-containing ethylenically unsaturated monomer (C-1) was obtained. The Mn of (C-1) was 1,600.

Production Example 2

A reaction vessel was charged with 100 parts of a caprolactone adduct of 2-hydroxyethyl acrylate (product name "PRACCEL FA-4D" produced by Daicel Corporation, the number of moles added: 4), 64 parts of a nurate compound of IPDI (product name "VESTANAT (registered trademark) T1890" produced by Evonik Japan Co., Ltd.), and 0.03 parts of a urethanation catalyst (bismuth tris(2-ethylhexanoate) (a 50% solution of 2-ethylhexanoic acid); the same shall apply hereinafter), and the reaction was carried out at 80° C. for 12 hours. Thus, a urethane group-containing ethylenically unsaturated monomer (C-2) was obtained. The Mn of (C-2) was 1,730.

Production Example 3

A reaction vessel was charged with 100 parts of polytetramethylene glycol (product name "PTMG-1000" produced by Mitsubishi Chemical Corporation, Mn of 1,000), 33.3 parts of IPDI, and 0.05 parts of the urethanation catalyst, and the reaction was carried out at 80° C. for four hours. Subsequently, 11.6 parts of 2-hydroxyethyl acrylate was added thereto (equivalent ratio of isocyanate group/hydroxyl group=1/1), and the reaction was carried out at 80° C. for 8 hours. Thus, a urethane group-containing ethylenically unsaturated monomer (C-3) was obtained. The Mn of (C-3) was 1,610.

Examples 1 to 9 and Comparative Examples 1 to 6

According to the composition (parts) shown in Table 1, the components (A) to (F) were uniformly mixed at 25° C. to obtain active energy ray-curable resin compositions of the examples and the comparative examples. The surface tension of each resin composition and performance of its cured product obtained by active energy ray irradiation were evaluated according to <Evaluation Items> described later. Table 1 shows the results.

TABLE 1

| | | | Examples | | | | | | | | | Comparative Examples | | | | | |
|---|---|---|---|---|---|---|---|---|---|---|---|---|---|---|---|---|---|
| | | | 1 | 2 | 3 | 4 | 5 | 6 | 7 | 8 | 9 | 1 | 2 | 3 | 4 | 5 | 6 |
| Composition (parts by weight) | Monofunctional ethylenically unsaturated monomer free of urethane groups (A) | A-1 | | 60 | | | | | | | | | | | 59 | | |
| | | A-2 | | | | | | | | 52 | | | | | | 60 | |
| | | A-3 | | | | 77 | | | 50 | | | | | | | | |
| | | A-4 | | | | | 65 | 63 | | | | | | | | | 71 |
| | | A-5 | | | | | 82 | | | | | | 40 | 55 | | | |
| | | A-6 | 50 | 50 | | | | | | 23 | | 51 | | | | | |
| | Polyfunctional ethylenically unsaturated monomer free of urethane groups (B) | B-1 | | | | | | 4 | | | 10 | | | | 10 | | |
| | | B-2 | 20 | 20 | 5 | 5 | | | | | | 20 | | | 5 | | |
| | | B-3 | | | | 5 | | | 10 | | | | 23 | 30 | | | |
| | | B-4 | | | | | 10 | 15 | | | | | | | | | 5 |
| | Urethane group-containing ethylenically unsaturated monomer (C) | C-1 | 23 | 23 | | | | | | | | 24 | 32 | | | | |
| | | C-2 | | | 24 | | 20 | | 10 | | | | | 10 | | | |
| | | C-3 | | | 7 | | | | 20 | | | | | 20 | | | |
| | | C-4 | | | | | | 6 | | 30 | | | | | | 25 | 8 |

TABLE 1-continued

| | | Examples | | | | | | | | | Comparative Examples | | | | | |
|---|---|---|---|---|---|---|---|---|---|---|---|---|---|---|---|---|
| | | 1 | 2 | 3 | 4 | 5 | 6 | 7 | 8 | 9 | 1 | 2 | 3 | 4 | 5 | 6 |
| Photopolymerization initiator (D) | D-1 | | | | 4.5 | | | | | | 2.9 | | | | | |
| | D-2 | | | | | | 2.9 | | | | | | | | | |
| | D-3 | | | 9.8 | | | | | 2.8 | | | | 4.9 | | | |
| | D-4 | 4.8 | 4.7 | | | 4.4 | | 1.6 | 3.5 | | 4.7 | | | 15.2 | 4.8 | 9.7 |
| Polymerization inhibitor (E) | E-1 | | | | | | 0.1 | | 0.2 | | | 0.1 | 0.1 | | | 6.0 |
| | E-2 | 0.2 | 0.3 | | | 0.1 | | 0.1 | | 0.1 | 0.3 | | | 0.5 | | |
| | E-3 | | | 1.1 | 0.5 | | | | | | | | | | 0.2 | |
| Surfactant (F) | F-1 | | 2 | | | | | | | | | | | | | |
| | F-2 | | | 0.1 | 1 | | 5 | | | | | | | | | |
| | F-3 | | | | | | | 0.3 | | | | | | | | |
| | F-4 | | | | | 0.5 | | | 0.5 | | | | | | | |
| | F-5 | | | | | | | | | 5 | | | | | | |
| | F-6 | | | | | | | | | | | 0.3 | | | | |
| | F-7 | | | | | | | | | | | | | 0.3 | | |
| | F-8 | 2 | | | | | | | | | | | | | | |
| | F-9 | | | | | | | | | | | | | | | 0.3 |
| Evaluation results | Static surface tension (mN/m) | 27 | 26 | 27 | 26 | 27 | 24 | 27 | 27 | 27 | 34 | 33 | 34 | 33 | 34 | 31 |
| | Contact angle (°) | 78 | 81 | 77 | 84 | 90 | 93 | 77 | 78 | 80 | 48 | 48 | 45 | 64 | 50 | 62 |
| | Scratch resistance load (g) | 400 | 450 | 400 | 450 | 510 | 500 | 460 | 450 | 430 | 200 | 200 | 200 | 250 | 200 | 250 |
| | Fracture energy (J) | 3.7 | 3.8 | 3.6 | 3.5 | 4.0 | 3.5 | 3.5 | 3.5 | 4.0 | 3.1 | 3.2 | 3.0 | 3.2 | 3.3 | 2.5 |
| | Fracture strength (N/mm$^2$) | 40 | 40 | 35 | 37 | 40 | 35 | 37 | 38 | 36 | 33 | 33 | 32 | 31 | 30 | 30 |
| | Glass transition temperature Tg (° C.) | 79 | 79 | 80 | 82 | 80 | 75 | 77 | 78 | 74 | 76 | 74 | 77 | 77 | 77 | 77 |

The symbols in Table 1 indicate as follows.

(A-1) t-Butyl cyclohexyl acrylate (product name "BLEMMER (registered trademark) TBCHA" produced by NOF Corporation, average functional group number of 1)

(A-2) Stearyl acrylate (product name "STA" produced by Osaka Organic Chemical Industry Ltd., average functional group number of 1)

(A-3) 1-Adamantyl acrylate (product name "1-AdA" produced by Osaka Organic Chemical Industry Ltd., average functional group number of 1)

(A-4) Isobornyl acrylate (product name "Lite Acrylate IBXA" produced by Kyoeisha Chemical Co., Ltd., average functional group number of 1)

(A-5) Dicyclopentanyl acrylate (product name "FANCRYL FA-513A" produced by Hitachi Chemical Co., Ltd., average functional group number of 1)

(A-6) Acryloylmorpholine (product name "ACMO (registered trademark)" produced by KJ Chemicals Corporation, average functional group number of 1)

(B-1) 1,9-Nonanediol diacrylate (product name "Lite Acrylate 1,9 ND-A" produced by Kyoeisha Chemical Co., Ltd., average functional group number of 2)

(B-2) Trimethylolpropane triacrylate (product name "SR-351" produced by Sartomer, average functional group number of 3)

(B-3) Cyclohexane dimethanol diacrylate (product name "CD406" produced by Sartomer, average functional group number of 2)

(B-4) Dimethyloltricyclodecane diacrylate (product name "Lite Acrylate DCP-A" produced by Kyoeisha Chemical Co., Ltd., average functional group number of 2)

(C-1) Urethane group-containing ethylenically unsaturated monomer (C-1) produced in Production Example 1

(C-2) Urethane group-containing ethylenically unsaturated monomer (C-2) produced in Production Example 2

(C-3) Urethane group-containing ethylenically unsaturated monomer (C-3) produced in Production Example 3

(C-4) Urethane acrylate (product name "Photomer 6010" produced by Cognis, average functional group number of 2, Mn of 1,300)

(D-1) Bis(2,4,6-trimethylbenzoyl)-phenylphosphine oxide (product name "IRGACURE (registered trademark) 819" produced by BASF)

(D-2) 2-Methyl-1-[4-(methylthio)phenyl]-2-morpholinopropan-1-one (product name "IRGACURE 907" produced by BASF)

(D-3) 1-Hydroxycyclohexyl phenyl ketone (product name "IRGACURE 184" produced by BASF)

(D-4) 2,4,6-Trimethylbenzoyl diphenylphosphine oxide (product name "Lucirin (registered trademark) TPO" produced by BASF)

(E-1) Phenothiazine (produced by Wako Pure Chemical Industries, Ltd.)

(E-2) Hydroquinone monomethyl ether (produced by Wako Pure Chemical Industries, Ltd.)

(E-3) Hydroquinone (produced by Wako Pure Chemical Industries, Ltd.)

(F-1) Dual-end reactive (amino group at both ends) silicone oil (product name "X-22-161B" produced by Shin-Etsu Chemical Co., Ltd.)

(F-2) Oligomer containing a fluorine-containing group, a hydrophilic group, and a lipophilic group (product name "Magafac F-470" produced by DIC Corporation)

(F-3) Oligomer containing a fluorine-containing group, a hydrophilic group, and a lipophilic group (product name "Magafac F-477" produced by DIC Corporation)

(F-4) Reactive silicone oil containing heterogeneous functional groups (heterogeneous functional groups: polyether group and amino group) (product name "X-22-3939A" produced by Shin-Etsu Chemical Co., Ltd.)

(F-5) Polyether modified silicone oil (product name "KF-355A" produced by Shin-Etsu Chemical Co., Ltd.)

(F-6) Polyether modified polydimethylsiloxane (product name "BYK 307" produced by BYK-Chemie Japan KK)

(F-7) Polyether modified polydimethylsiloxane (product name "BYK 331" produced by BYK-Chemie Japan KK)

(F-8) Dual-end reactive (epoxy group at both ends) silicone oil (product name "X-22-163A" produced by Shin-Etsu Chemical Co., Ltd.)

(F-9) Polyether modified polydimethylsiloxane (product name "BYK 333" produced by BYK-Chemie Japan KK)

The methods for evaluating the active energy ray-curable resin composition and its cured product are as follows.

[1] Method for evaluating the active energy ray-curable resin composition

<Evaluation Items>

(1) Static surface tension (mN/m)

The static surface tension (mN/m) of each active energy ray-curable resin composition was measured by the Wilhelmy method with a platinum plate using a surface tensiometer (model number CBVB-A3: produced by Kyowa Interface Science Co., Ltd.) at 25° C.

[2] Method for Evaluating the Cured Product Obtained by Active Energy Ray Irradiation A glass plate (product name "GLASS PLATE" produced by AS ONE Corporation, 200 mm×200 mm×5 mm (thickness)) was provided. Spacers (1 mm in thickness) were placed on the four sides of the upper face of the glass plate and square compartments (10 cm×10 cm) were created. Each of the active energy ray-curable resin compositions shown in Table 1 was separately casted into the square compartment. Subsequently, another similar glass plate was placed over the glass plate. Using an ultraviolet light irradiation device (model number "ECS301G1" produced by Eye Graphics Co., Ltd; the same shall apply hereinafter), the active energy ray-curable resin compositions were irradiated with 300 mJ/cm$^2$ of ultraviolet light, and then the resulting cured products were released from the glass plates. Each cured product was cut out with a cutter into the shape having a width of 5 mm and a length of 50 mm to obtain a test piece of a molded product. Each test piece was evaluated for its performance by the following method. The evaluation result is the average of five test pieces. The evaluation of "(2) Scratch resistance load" was carried out using cured products having a square shape (10 cm×10 cm) released from the glass plates instead of the test pieces.

<Evaluation Items>

(1) Tg (° C.)

A dynamic mechanical analysis (DMA) device (model number "Rheogel-E4000" produced by UBM) was used for measurement by the DMA method in tension mode at 10 Hz.

(2) Scratch Resistance Load (g)

In an electric pencil scratch hardness tester "No. 533-M Film Hardness Tester by Means of Pencils" produced by Yasuda Seiki Seisakusho LTD, steel wool #0000 (product name "Bonstar" produced by Nippon Steel Wool Co., Ltd.) was securely attached with tape to a lowest part of an axis of the tester to which a weight is to be attached. Weights were added in increments of 50 g. Each cured product to be evaluated for its performance was placed on the pencil hardness meter, and the steel wool was horizontally moved once on the cured product at a rate of 60 mm/min to carry out a friction test. One minute after the test, the appearance was visually checked according to the following "Criteria", and the maximum weight that the cured product was able to withstand ("good" described below) was regarded as the scratch resistance load (g).

"Criteria"

Good: No scratches are observed.
Poor: One or more scratches are observed.

(3) Contact Angle (°)

The contact angle of ion-exchanged water with respect to each cured product obtained by active energy ray irradiation (test piece) was measured with a fully automatic contact angle meter ("Fully Automatic Contact Angle Meter DM700" produced by Kyowa Interface Science Co., Ltd.).

(4) Fracture Strength (N/Mm$^2$)

Using a tension tester (produced by Shimadzu Corporation), the test piece was stretched at a testing rate of 50 ram/min to measure the tensile strength at break in accordance with JIS K7113 as the fracture strength.

(5) Fracture Energy (Brittleness) (J)

During the measurement in (4) above, the energy that was applied until fracture occurred was determined from the area under stress-strain curve, and the calculated energy was regarded as the fracture energy. A higher fracture energy indicates greater toughness, and a lower fracture energy indicates greater brittleness.

According to the results in Table 1, the cured products obtained by curing the active energy-ray curable resin compositions (Examples 1 to 9) of the present invention have fewer scratches than the cured products obtained by curing the comparative active energy-ray curable resin compositions (Comparative Examples 1 to 6). Thus, it is clear that the resin compositions of the present invention are superior not only in improving the scratch resistance of the cured products obtained by active energy ray irradiation but also in maintaining mechanical characteristics of the cured products.

INDUSTRIAL APPLICABILITY

The cured product of the present invention obtainable from the active energy ray-curable resin composition of the present invention can be suitably used as various industrial materials such as a coating material and is very useful.

The invention claimed is:

1. An active energy ray-curable resin composition comprising:
   (A) an alicyclic skeleton-containing (meth)acrylate selected from the group consisting of isobornyl (meth)acrylate, adamantyl (meth)acrylate, and dicyclopentanyl (meth)acrylate;
   (B) an alicyclic skeleton-containing di(meth)acrylate selected from the group consisting of cyclohexane dimethanol di(meth)acrylate and dimethyloltricyclodecane di(meth)acrylate;
   (C) a urethane group-containing ethylenically unsaturated monomer which is a reaction product of (a2) an ε-caprolactone adduct of an alkylene oxide adduct of (meth)acrylic acid and (b) an alicyclic polyisocyanate or a nurate compound thereof;
   (D) a photopolymerization initiator selected from the group consisting of a phosphine oxide and an acetophenone compound;
   (E) a polymerization inhibitor selected from the group consisting of a phenol compound and an amine compound; and
   (F) a surfactant which is a polysiloxane modified with an amino group and a polyether group,
   wherein relative to the total weight of (A), (B), (C), (D), (E), and (F), the weight ratio of (A) is 45 to 90% by weight, the weight ratio of (B) is 3 to 25% by weight, the weight ratio of (C) is 3 to 35% by weight, the weight ratio of (D) is 0.1 to 10% by weight, the weight ratio of (E) is 0.01 to 5% by weight, and the weight ratio of (F) is 0.1 to 10% by weight, and
   the resin composition has a surface tension of 20 to 30 mN/m.

2. The active energy ray-curable resin composition according to claim 1, wherein a cured product obtained by active energy ray irradiation has a glass transition temperature of 50° C. to 150° C.

3. A cured product obtained by curing the active energy ray-curable resin composition according to claim 1 by active energy ray irradiation.

4. The active energy ray-curable resin composition according to claim 1, wherein the alicyclic skeleton-containing (meth)acrylate (A) is selected from the group consisting of isobornyl (meth)acrylate and adamantyl (meth) acrylate.

5. The active energy ray-curable resin composition according to claim 1, wherein (C) is a reaction product of (a2) an ε-caprolactone adduct of an alkylene oxide adduct of (meth)acrylic acid and (b) isophorone diisocyanate (IPDI) or a nurate compound thereof.

6. The active energy ray-curable resin composition according to claim 1, wherein the photopolymerization initiator (D) is selected from the group consisting of 1-hydroxycyclohexyl phenyl ketone, 2,4,6-trimethylbenzoyl diphenylphosphine oxide, and bis(2,4,6-trimethylbenzoyl)-phenylphosphine oxide.

7. The active energy ray-curable resin composition according to claim 1, wherein the polymerization inhibitor (E) is selected from the group consisting of phenothiazine and hydroquinone monomethyl ether.

* * * * *